(12) United States Patent
Durst et al.

(10) Patent No.: US 10,837,564 B2
(45) Date of Patent: Nov. 17, 2020

(54) NOZZLE CHECK VALVE

(71) Applicant: GOODWIN PLC, Stoke-on-Trent (GB)

(72) Inventors: Christian Durst, Juechen (DE);
Timothy James Preston, Stoke-on-Trent (GB)

(73) Assignee: GOODWIN PLC, Stoke-on-Trent (GB)

( * ) Notice: Subject to any disclaimer, the term of this patent is extended or adjusted under 35 U.S.C. 154(b) by 148 days.

(21) Appl. No.: 15/553,105

(22) PCT Filed: Feb. 17, 2016

(86) PCT No.: PCT/GB2016/050392
§ 371 (c)(1),
(2) Date: Aug. 23, 2017

(87) PCT Pub. No.: WO2016/135453
PCT Pub. Date: Sep. 1, 2016

(65) Prior Publication Data
US 2018/0245702 A1     Aug. 30, 2018

(30) Foreign Application Priority Data

Feb. 24, 2015 (GB) .................... 1503056.2

(51) Int. Cl.
*F16K 15/06* (2006.01)
*F16K 15/02* (2006.01)
(Continued)

(52) U.S. Cl.
CPC .......... *F16K 15/063* (2013.01); *F16K 15/028* (2013.01); *F16K 15/08* (2013.01);
(Continued)

(58) Field of Classification Search
CPC ...... F16K 15/063; F16K 15/028; F16K 15/08; F16K 15/12; Y10T 137/7837; Y10T 137/786; Y10T 137/7861; Y10T 137/7935
See application file for complete search history.

(56) References Cited

U.S. PATENT DOCUMENTS 1,327,564 A * 1/1920 McDougall ........... F04B 53/103
  137/514.3
1,379,173 A * 5/1921 Decrow .................. F16K 15/08
  137/516.21
(Continued)

FOREIGN PATENT DOCUMENTS

CN    200958638 Y    10/2007
CN    203453558 U     2/2014
(Continued)

OTHER PUBLICATIONS

Search Report regarding Chinese Patent Application No. 201680011835. 4, dated Oct. 22, 2018, Translation provided by JA Kemp.
(Continued)

*Primary Examiner* — Marina A Tietjen
*Assistant Examiner* — Frederick D Soski
(74) *Attorney, Agent, or Firm* — Harness, Dickey & Pierce, P.L.C.

(57) ABSTRACT

A nozzle check valve comprises a valve body (10) and a nozzle (20) centrally arranged within the upstream end of valve body (10), a fluid channel (90) is defined by the outer face of the nozzle (20) and the inner face of the valve body (10). A guide bush (60) is mounted on a nozzle axial extension (26) and an annular disc (30) comprising a disc sealing ring (31) connected to a central barrel (32,33) by a plurality of webs (34) is mounted on the guide bush (60) for axial movement of the annular disc (30) relative to the valve body to open and close the fluid channel (90). A spacer (80) is arranged on the nozzle axial extension (26) downstream of
(Continued)

the guide bush (60) and a diffuser (40) is arranged on the downstream side of the spacer (80). A spring (50) between the annular disc (30) and the diffuser (40) urges the disc towards the valve closed position. The stroke of the valve, the maximum movement of the annular disc (30) from the valve closed position to the valve open position where the annular disc (30) is in contact with the upstream face of the diffuser (40), is determined by the axial length of the spacer (80). The centre of mass of the annular disc (30) is located along the central axis of the disc (30) at an axial position where the barrel (32) is in sliding contact with the guide bush (60).

19 Claims, 3 Drawing Sheets

(51) Int. Cl.
*F16K 15/08* (2006.01)
*F16K 15/12* (2006.01)
(52) U.S. Cl.
CPC ........... *F16K 15/12* (2013.01); *Y10T 137/786* (2015.04); *Y10T 137/7837* (2015.04); *Y10T 137/7861* (2015.04); *Y10T 137/7935* (2015.04)

(56) References Cited

U.S. PATENT DOCUMENTS

| | | | | |
|---|---|---|---|---|
| 1,450,135 A * | 3/1923 | Clark | ............... | F04B 11/0016 417/569 |
| 1,681,364 A * | 8/1928 | Richardson | ............. | F16K 15/08 137/516.21 |
| 1,690,836 A * | 11/1928 | Redfield | ................ | F16K 15/12 137/516.19 |
| 1,789,711 A * | 1/1931 | Richardson | ............. | F16K 15/08 137/516.21 |
| 1,856,617 A * | 5/1932 | Bebbington | ............ | F16K 15/12 137/516.19 |
| 1,909,974 A * | 5/1933 | Longacre | ................ | F16K 15/10 137/514.3 |
| 1,971,171 A * | 8/1934 | Bebbington | ............ | F16K 15/10 137/516.13 |
| 2,082,512 A * | 6/1937 | Richardson | ............. | F16K 15/12 137/516.21 |
| 2,090,486 A * | 8/1937 | Richardson | ......... | F04B 39/1033 137/516.21 |
| 2,197,606 A * | 4/1940 | Birch | ................... | F04B 53/103 137/516.23 |
| 2,639,726 A * | 5/1953 | Golob | ................ | G05D 16/0619 137/493 |
| 2,649,277 A * | 8/1953 | Blackford | ............ | F16K 15/028 137/454.5 |
| 2,809,660 A * | 10/1957 | Becker | ................ | F16K 15/026 137/514.3 |
| 3,156,259 A * | 11/1964 | Havelka | ............... | B01D 35/147 137/516.23 |
| 3,160,112 A * | 12/1964 | Flaton | ................. | F04D 15/0083 137/543.15 |
| 4,911,196 A * | 3/1990 | Kemp | .................. | F16K 15/026 137/220 |
| 4,971,101 A * | 11/1990 | Becker | ..................... | B22F 7/08 137/375 |
| 5,065,790 A * | 11/1991 | Kornas | .................. | B60T 13/52 137/514.5 |
| 5,080,122 A | 1/1992 | Neuzeret | | |
| 5,483,992 A * | 1/1996 | Lehmann | ........... | F04B 39/1033 137/516.21 |
| 5,921,276 A | 7/1999 | Lam et al. | | |
| 6,539,974 B2 * | 4/2003 | Steinruck | ............ | F04B 39/1033 137/512.1 |
| 7,588,047 B2 * | 9/2009 | Vogt | ...................... | F02B 37/013 137/220 |
| 8,147,225 B2 * | 4/2012 | Kuny | .................... | F04B 39/102 137/542 |
| 9,383,031 B2 * | 7/2016 | Shelcoviz | ............. | F16K 15/063 |
| 2008/0149196 A1 * | 6/2008 | Spiegl | ................. | F04B 39/1033 137/543.15 |
| 2008/0185055 A1 * | 8/2008 | Niedermair | ........... | F16K 15/028 137/540 |
| 2009/0252627 A1 | 10/2009 | Koeck | | |
| 2010/0101668 A1 * | 4/2010 | Roorda | ................. | F16K 15/063 137/540 |
| 2013/0092261 A1 * | 4/2013 | Andersson | .............. | F16K 15/06 137/511 |
| 2013/0306167 A1 * | 11/2013 | Sisk | ....................... | F16K 15/026 137/540.11 |
| 2015/0198179 A1 * | 7/2015 | Lucas | ................... | F04D 29/668 137/14 |

FOREIGN PATENT DOCUMENTS

| | | |
|---|---|---|
| DE | 202014781 U1 | 11/2002 |
| DE | 20-2010-010935 U1 | 10/2010 |
| EP | 2405163 A1 | 1/2012 |
| JP | H03209077 A | 9/1991 |
| JP | H04203683 A | 7/1992 |

OTHER PUBLICATIONS

First Office Action regarding Chinese Patent Application No. 201680011835.4, dated Oct. 22, 2018, Translation provided by JA Kemp.
Entech Non-Slam, Nozzle Check Valve Product Flyer, Houston, TX 77042 USA, Cameron, 2013, valves@c-a-m.com / www.c-a-m.com/valves, pp. 1-4.
Norvea GmbH Product Catalogue, Nozzle Check Valves, Norvea GmbH, Monchengladbach, Germany, http://www.noreva.de, Apr. 13, 2005, pp. 1-24.
International Search Report and Written Opinion of the International Searching Authority issued in PCT/GB2016/050392, dated Apr. 29, 2016; ISA/EP.

* cited by examiner

NOZZLE CHECK VALVE

CROSS REFERENCE TO RELATED APPLICATIONS

This application is a U.S. National Phase Application under 35 U.S.C. 371 of International Application No. PCT/GB2016/050392 filed on Feb. 17, 2016 and published in English as WO 2016/135453 A1 on Sep. 1, 2016. This application is based on and claims the benefit of priority from Great Britain Patent Application No. 1503056.2 filed on Feb. 24, 2015. The entire disclosures of all of the above applications are incorporated herein by reference.

The present invention relates to a nozzle check valve. Check valves for gaseous and liquid media are used for example in gas and liquid pipe lines to automatically stop reverse flow as quickly as possible without any actuation thereby preventing problems including water hammer, damage to equipment such as pumps and the mixing of line liquids and gases. Nozzle check valves, also sometimes referred to as axial check valves, are faster acting than other types of check valves such as dual plate check valves and swing check valves. The faster the valve can close when reverse flow starts the less shock there will be when the fluid that has started to flow backwards is brought to an abrupt halt.

The general principle of the nozzle check valve is the use of a disc which moves axially in response to fluid flow in the normal flow direction against a closing force, generally a spring. When flow is shut off the disc moves axially to seal and prevent reverse flow. The most common design of nozzle check valve uses a mushroom piston to seal the flow path. The applicant and its associated company Noreva GmbH uses a mushroom design of sealing disc for smaller valve sizes up to a 12 inch (30 cm) nominal bore. For larger sizes the applicant and Noreva GmbH use a nozzle check valve design comprising a nozzle axially located in a valve body at the upstream side of the body providing an annular flow passage which can be closed by a ring shaped closure. The ring disc is typically held in position by leaf springs urging the disc towards the closed position. An example of such an arrangement is given in German Utility Model DE 202 14 781 U1. Other manufacturers use mushroom piston tube discs for all valve sizes.

There are many pipeline applications where there are low gas flows at times. During low gas flow periods the mushroom type discs may not open because of their weight or may spend much of the time in the half closed position and as such the flow coefficient and pressure loss are very different to normal flow conditions for which the valves are specified and designed. Some of the manufactures who use mushroom type discs on larger bore valves have an antirotation pin attached to the mushroom disc to stop the disc rotating during the long periods it spends neither fully open nor fully closed.

The Noreva valve with a ring disc supported on leaf springs has a very much lighter disc than an equivalent valve with a mushroom disc. Lightness of disc is important in permitting rapid closing which reduces the shock when the fluid that has started to flow backwards is brought to an abrupt halt. The leaf spring support is a more complex arrangement with the requirement to ensure smooth movement and to try to minimise oscillation of the disc even if the valve is operated outside the specified flow conditions when it is subject to turbulent and fluctuating flows of fluid in order to limit the risk of self damage such oscillation could cause.

German Utility Model DE 202010010935 of Noreva GmbH and EP 2 405 163 A1 of Cameron International Corporation disclose an alternative means for mounting a ring disc in a nozzle check valve. In this arrangement the ring disc is formed with three radial arms connected to a central barrel arranged for axial movement on an extension projecting axially in the downstream direction from the nozzle. The ring disc assembly may move against the resistance of a spring from a closed position in which the annular flow passage is sealed to a fully open position in which the ring disc abuts the upstream end of a diffuser located downstream of the nozzle. Such disc arrangements are heavier than the ring disc supported on leaf springs but still significantly lighter than the mushroom discs of equivalent sized valves.

For a given range of flow and pressure conditions for which a valve is to be used, the stroke of the valve disc, the movement between the valve closed and the valve fully open position, and spring strength is adjusted by the manufacturer. For both the mushroom disc valves and the valves with ring discs supported on leaf springs this adjustment can only be performed at the manufacturer's factory.

EP 2 405 163 A1 of Cameron International Corporation referred to above discloses a nozzle check valve comprising a valve body, a nozzle arranged in the upstream end of the valve body to provide an annular flow passage, and an axial shaft protruding from the downstream side of the nozzle. Mounted on the shaft is an axial disc having three radial arms connected to a central barrel. Also mounted on the axial shaft downstream of the axial disc are a spring and a spacer comprising slots for receiving the radial arms of the ring disc, the outer walls of the spacer defining the inner circumference of a first flow passage, and a diffuser, the inner walls of the diffuser defining the outer circumference of the first flow passage. A second annular flow passage is defined by the outside walls of the diffuser and the inner walls of the valve body. EP 2 405 163 A1 suggests that different designs of spacer may be used for different types of flow conditions. Shorter or longer slots in the spacer are said to allow for easy reconfiguration of the stroke of the ring disc. The location of the diffuser relative to the annular flow passage is determined by the length of the axial shaft. Reducing the range of movement of the sealing disc by reducing the slot length in the spacer would result in the sealing disc stopping short of the diffuser body and this would disrupt smooth flow through the second flow passage.

The present invention enables the positioning of a diffuser downstream of the nozzle defining an annular passage to be moved relative to the nozzle to increase or decrease the stroke of a sealing disc between a valve closed position and a valve open position in which the sealing disc is in contact with the diffuser in a simple and reliable manner.

In accordance with the present invention there is provided a nozzle check valve comprising:

a valve body;

a nozzle arranged within the valve body and defining an annular fluid channel;

an annular disc arranged within the valve body and configured to move in an axial direction relative to the valve body to open and close the fluid channel; and a spacer arranged such that the maximum distance moveable by the annular disc in an axial direction relative to the valve body is determined by the axial length of the spacer.

The present invention permits the user to alter the stroke of the valve disc by changing the spacer for a spacer of a different length. This change can easily be carried out at the user's site and does not require the valve to be returned to the manufacturer. This saves the user time and cost if the user needs to change the operating conditions of the plant in which the valve is installed.

BRIEF DESCRIPTION OF THE DRAWINGS

The present invention will now be described by way of non-limiting example only with reference to the accompanying drawings in which.

DETAILED DESCRIPTION OF THE SPECIFIC EMBODIMENTS

Figure 1:
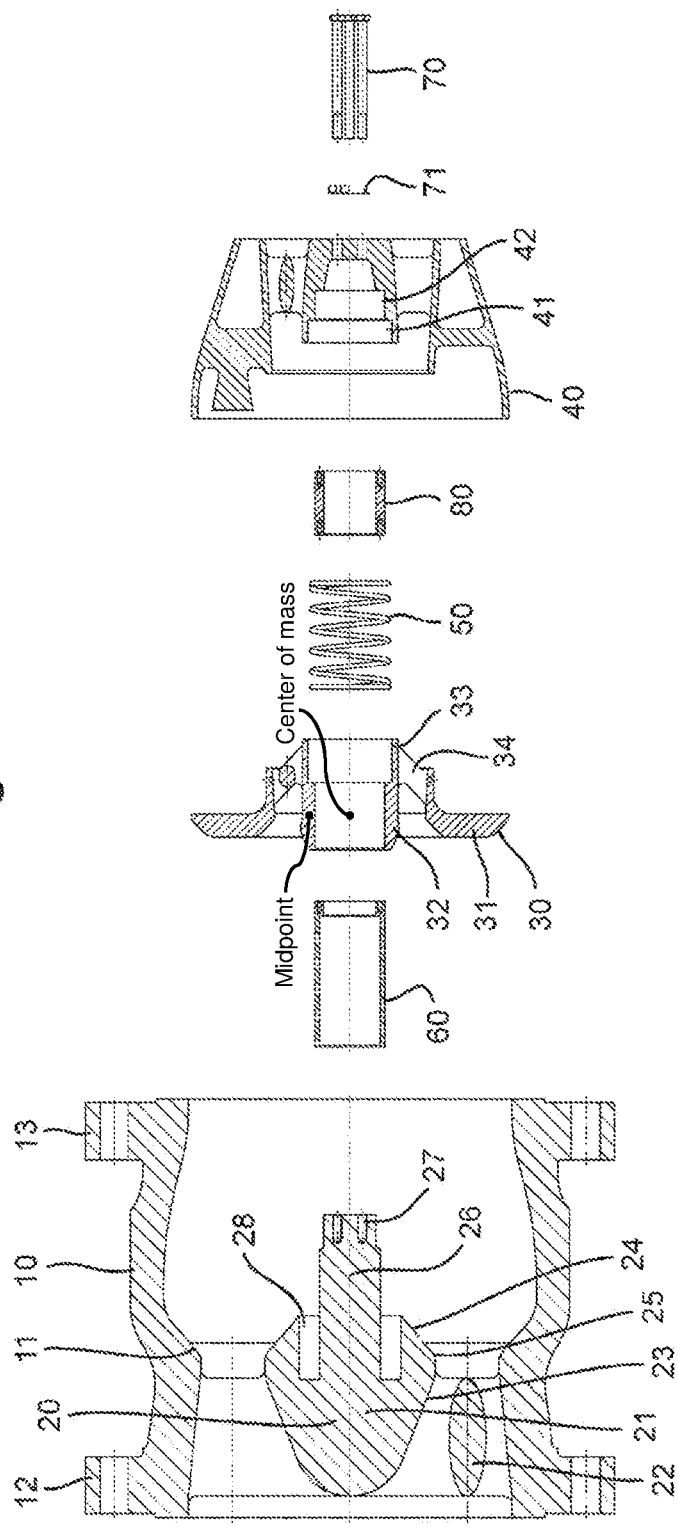
FIG. 1 is a cross sectional exploded view of a nozzle check valve according to the invention.

In the figures the following numbers are used to indicate the following:

10 valve body
11 valve body valve seat
12 flange end, upstream
13 flange end, downstream
20 nozzle
21 nozzle body
22 nozzle web
23 nozzle upstream face
24 nozzle downstream face
25 nozzle valve seat
26 nozzle downstream axial extension
27 nozzle bolt hole
28 nozzle guide bush and disc barrel slot
30 disc
31 disc sealing ring
32 disc mounting barrel
33 disc spring receiving barrel
34 disc web
40 diffuser
41 diffuser spring seat
42 diffuser spacer seat
50 spring
60 guide bush
70 tie bolt
71 tie bolt tab washer
80 spacer
90 annular flow passage
91 first flow passage
92 second flow passage In the description upstream or upstream end is used to identify a position by reference to a normal flow through the valve from the upstream to downstream end.

Figure 3:
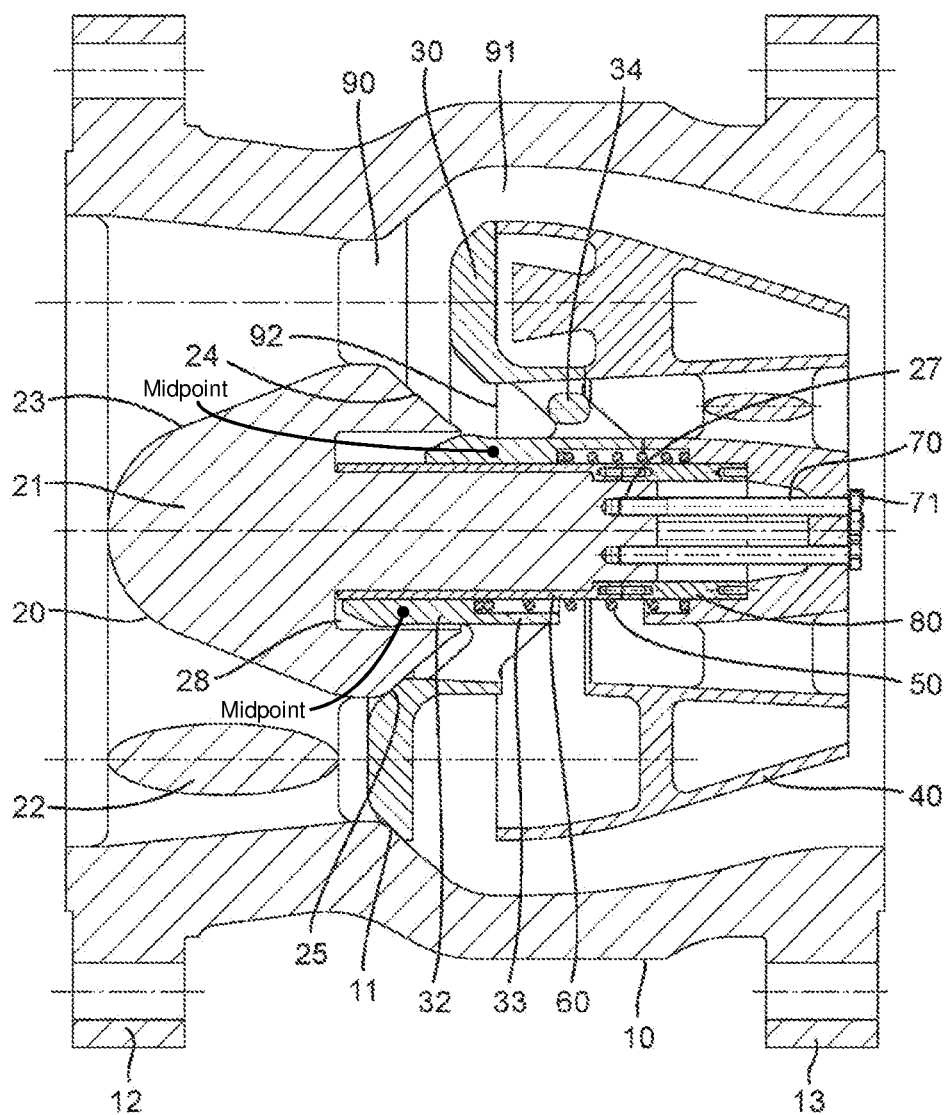
FIG. 3 is a cross-sectional side view of a nozzle check valve according to the invention.

In FIG. 3 the bottom half of the figure depicts the valve in the closed position and the top half depicts the valve in the open position.

Figure 2:
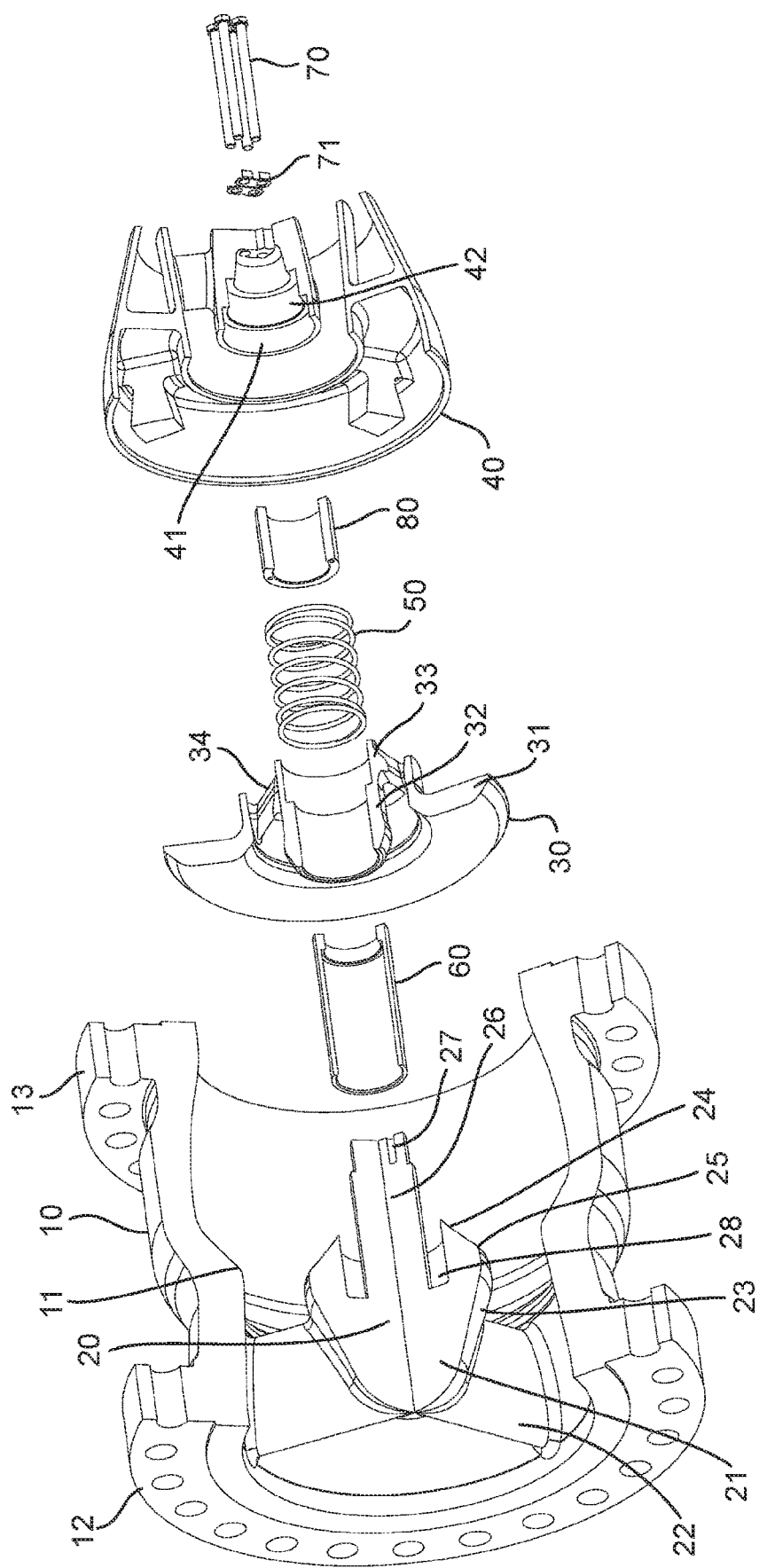
FIG. 2 is an exploded perspective view of a nozzle check valve according to the invention.

Referring to FIGS. 1-3, an example nozzle check valve according to the invention comprises a valve body 10 fitted with a nozzle 20 comprising nozzle body 21 and a plurality of radial nozzle webs 22 connecting the nozzle body 21 to the inside of the valve body 10. Advantageously the valve body 10 and nozzle 20 may be formed as a single casting. The valve body is shown with upstream and downstream flanged ends 12,13 for connection to the valve body to adjacent pipework. Other connecting ends (weld ends, butt ends) may be used. The nozzle body 21 has a nozzle upstream face 23 diverging from a central point in a downstream direction and a nozzle downstream face 24 converging in a downstream direction. The nozzle 20 further comprises a downstream axial extension 26. The nozzle axial extension 26 may conveniently be formed integrally with the nozzle body 20 and more desirably be formed as part of a single casting with the valve body 10 and nozzle body 20. Alternatively the nozzle downstream axial extension 26 may be separately provided and suitably attached to the nozzle body 20.

A sealing disc 30 comprises a disc sealing ring 31 and a disc barrel 32,33, comprising a disc mounting barrel 32 and disc spring receiving barrel 33, the barrel 32,33 and disc sealing ring 31 being connected by a plurality of disc webs 34. The sealing disc 30 is mounted on the nozzle downstream axial extension 26 so as to permit axial movement of the sealing disc 30. Advantageously as shown in the figures a guide bush 60 may be arranged between the nozzle downstream axial extension 26 and the disc mounting barrel 32. The material of the guide bush 60 may be selected to provide a reduced friction for ease of axial movement of the sealing disc 30. The disc spring receiving barrel portion 33 is downstream of the disc mounting barrel portion 32 and has a wider internal diameter than the disc mounting barrel portion 32 in order to accommodate a coil spring 50 and to avoid contact with the guide bush 60 so that only the disc mounting barrel portion 32 is in sliding contact with the guide bush 60.

A hollow substantially cylindrical spacer 80 having an external diameter which is substantially the same as the external diameter of the guide bush 60 is located downstream of the guide bush 60 and serves to establish the axial location of a diffuser 40. The axial location of diffuser 40 in turn determines the maximum axial movement of the sealing disc 30 relative to a valve closed position in which the upstream face of the sealing disc 30 contacts a valve seat formed by a valve seat portion 11 of the valve body 10 and a nozzle valve seat portion 25 on the nozzle downstream face 24 of nozzle 20. The downstream end of spring 50 is located in diffuser spring seat 41. The downstream end of the spacer 80 is located in the diffuser spacer seat 42. The whole assembly is retained using tie bolts 70, tie bolt tab washer 71 and nozzle bolt holes 27 formed in the nozzle 20.

As most easily shown in FIG. 3 the outside of nozzle 20 and inside of valve body 10 together form an annular flow passage 90. In the open position, depicted in the top half of FIG. 3, this annular flow passage becomes downstream a first flow passage 91 and a second flow passage 92. The first flow passage 91 is defined between the inner face of the valve body 10 and the outer face of the diffuser 40 and disc 30. The second flow passage 92 is defined by the outer surface of the nozzle downstream face 24 and the inner surface of the diffuser 40 and disc 30 and the outer surface of disc barrel 32/33. When normal flow is disrupted, sealing disc 30 will be urged axially in an upstream direction away from contact with the diffuser 40 and into contact with the valve body valve seat 11 and nozzle valve seat 25 thus preventing reverse flow.

The stroke of the valve, i.e. the movement between the valve closed position in which the sealing disc 30 is at its position nearest to the upstream end of the valve in sealing contact with the valve body valve seat 11 and the nozzle valve seat 25, and the valve open position where the downstream face of the sealing disc 30 is in contact with the upstream face of the diffuser 40, can easily be varied by the use of a spacer 80 with a different length, a shorter spacer for a shorter stroke. It may be desirable also to replace the spring 50 with a shorter or longer spring 50 for a shorter or longer spacer 80 to achieve the optimum opening and closing characteristics. By providing a suitable depth of nozzle bolt hole 27 the same tie bolt 70 may be used with different length spacers 80. Alternatively, shorter or longer tie bolts 70 may be used with shorter or longer spacers 80. In an alternative embodiment not illustrated, a second cylindrical spacer may be provided downstream of the diffuser 40 when a shorter first spacer 80 is employed so as to accommodate the use of the same length tie bolt 70 with both shorter and longer first spacers 80.

The sealing disc 30 is most clearly illustrated in FIG. 1. The disc sealing ring 31 may as shown have a shape with the upstream face being generally flat with return chamfers on the outer circumferential edge and the inner edge. Alternatively the ring may be substantially toroidal or semi-toroidal. The angle of the downstream face of the disc sealing ring may be selected to optimise flow and sealing characteristics.

In order to optimise the stability of the sealing disc 30 and freedom of axial movement, the centre of mass of the sealing disc 30 is arranged to be centrally located at an axial point within the area of contact between the disc mounting barrel 32 and the guide bush 60. Most preferably the centre of mass is located at an axial location approximately half way along the disc mounting barrel 32 such as within 25% of the length of the disc mounting barrel 32 from its midpoint, more preferably within 10% of the length of the disc mounting barrel 32 from its midpoint.

To permit mounting of the guide bush 60 and to permit axial movement of the disc mounting barrel 32 towards the valve closed position, that is to say axial movement of the sealing disc 30 towards the upstream end of the valve body, a cylindrical slot 28 may be formed in the downstream end of the nozzle 20 of a size able to accommodate the guide bush 60 and disc mounting barrel 32. By mounting the disc webs 34 on the disc spring receiving barrel portion 33 which is located downstream of the disc mounting barrel portion 32 and is of wider internal diameter than the inner diameter of the disc mounting barrel portion 32 and the outer diameter of the guide bush 60, the disc webs 34 do not interfere with axial movement of the sealing disc 30 towards the valve closed position and permit the arrangement of the centre of mass of the sealing disc 30 within the length of the disc mounting barrel portion 32 which is in sliding contact with the guide bush 60.

The use of a sealing disc 30 mounted for axial movement on a nozzle downstream axial extension 26 avoids the low or intermittent flow disadvantages of both the mushroom sealing disc (too heavy to open, slow opening, rotation) and the leaf spring supported disc (flutter) particularly when the sealing disc 30 is mounted in a balanced manner with the centre of gravity of the disc 30 being axial and within the barrel 32 where the barrel 32 is in contact with the guide bush 60. The sealing disc 30 assembly of ring 31, barrel 32,33 and webs 34 need not be significantly heavier than a ring disc without barrel and webs and is considerably lighter than a mushroom sealing disc of the same size. A comparison of 24 inch (60 cm) sealing discs of a simple ring design (ring disc with no barrel or webs for mounting on leaf springs), a ring disc with central barrel and webs as described herein and a mushroom disc is shown in Table 1. The weight difference between a disc as described with respect to FIGS. 1 to 3 and the Noreva traditional ring disc is only 20% more as compared to the mushroom disc that is 200% more weight.

TABLE 1

| Disc Type | Weight | Weight v Ring Disc with no barrel/webs |
|---|---|---|
| 24 inch Ring Disc no barrel/webs | 62 kg | |
| 24 inch Ring Disc with barrel/webs | 75 kg | 20% increase |
| 24 inc Mushroom Disc | 191 kg | 200% increase |

In addition to being significantly heavier and so slower to respond than a disc with barrel and webs, the mushroom disc is not balanced in the manner contemplated by the present invention. The piston end of the mushroom valve is generally slidably received in a cylindrical bushing. Axial movement is guided by the bushing but in a non-balanced manner as the centre of mass of the mushroom disc is not within the bushing. Such non-balanced guiding may eventually lead to wear in the components and a risk of the valve sticking and not moving freely between a valve open and valve closed position.

Whilst a ring disc with barrel/webs is not as light as a ring disc without barrel/webs it has the advantage of providing for balanced guiding on the axial extension by arranging the centre of mass to be in the correct position to achieve this.

The balanced guiding can thus be achieved by providing a nozzle check valve comprising:

a valve body 10;

a nozzle 20 centrally arranged within the upstream end of valve body 10 and connected to said valve body 10 by a plurality of webs 22, said nozzle having an upstream face 23 diverging from a central position in the downstream direction and a downstream face 24 converging in a downstream direction and further comprising a downstream axial extension 26;

a fluid channel 90 defined by the outer face of the nozzle and the inner face of the valve body;

a guide bush 60 mounted on said nozzle axial extension 26;

an annular disc 30 comprising a disc sealing ring 31 connected to a central barrel 32 by a plurality of webs 33 said barrel being mounted on said guide bush for axial movement of the annular disc 30 relative to the valve body to open and close the fluid channel 90;

a diffuser 40 arranged within the downstream side of the valve body 80;

a spring 50 arranged between the annular disc 30 and the diffuser 40;

wherein the centre of mass of the annular disc 30 is located along the central axis of the disc 30 at an axial position where the barrel 32 is in sliding contact with the guide bush 60.

Preferably the centre of mass of the annular disc 30 is located along the central axis of the disc 30 at an axial position within 20% of the length of the portion of the barrel 32 in sliding contact with the guide bush 60 from the midpoint of the portion of the barrel 32 in sliding contact with the guide bush 60. More preferably the centre of mass of the annular disc 30 is located along the central axis of the disc 30 at an axial position at the midpoint of the portion of the barrel 32 in sliding contact with the guide bush 60.

The use of a ring disc with barrel and webs further provides for an arrangement for easy adjustment of the stroke of the valve. By the simple expedient of varying the length of the cylindrical spacer 80 with, if required, length of spring 50 and tie bolts 70, the distance between the upstream face of the diffuser 40 and the valve seat areas can be lengthened or shortened. This has the result of lengthening or shortening the stroke of the valve in order to accommodate different flow requirements. Such alteration can readily be performed on site and does not necessitate the return of the valve to the factory.

The invention claimed is:

1. A nozzle check valve comprising:
a valve body;
a nozzle arranged within the valve body;
a fluid channel;
an annular disc arranged within the valve body and configured to move in an axial direction relative to the valve body to open and close the fluid channel;
a diffuser; and
a discrete spacer arranged to establish the axial location of the diffuser such that the axial location of the diffuser determines a maximum distance moveable by the annular disc in an axial direction relative to the valve body.

2. The nozzle check valve according to claim 1, wherein the annular disc comprises a central barrel.

3. The nozzle check valve according to claim 2, wherein the nozzle comprises an axial extension configured to pass through the central barrel of the annular disc.

4. The nozzle check valve according to claim 3 wherein a guide bush is provided around the nozzle axial extension between the nozzle axial extension and the central barrel of the annular disc, wherein the spacer is located downstream of the guide bush.

5. The nozzle check valve according to claim 2, wherein the diffuser is fixed in position relative to the valve body, wherein the spacer is arranged between the downstream face of the annular disc in the valve open position and the diffuser.

6. The nozzle check valve according to claim 5, further comprising a spring arranged between the annular disc and the diffuser.

7. The nozzle check valve according to claim 6, wherein the spring is in a compressed state when the fluid channel is open.

8. The nozzle check valve according to claim 5, wherein the diffuser is fixed to an axial extension of the nozzle via fixing means.

9. The nozzle check valve according to claim 5, wherein the annular disc abuts against the diffuser when the fluid channel is fully open.

10. A nozzle check valve comprising:
a valve body;
a nozzle centrally arranged within the upstream end of valve body and connected to said valve body by a plurality of webs, said nozzle having an upstream face diverging from a central position in the downstream direction and a downstream face converging in a downstream direction and further comprising a downstream axial extension;
a fluid channel defined by the outer face of the nozzle and the inner face of the valve body;
a guide bush mounted on said nozzle axial extension;
an annular disc comprising a disc sealing ring connected to a central barrel by a plurality of webs, said barrel being mounted on said guide bush for axial movement of the annular disc relative to the valve body to open and close the fluid channel;
a discrete spacer arranged on the nozzle axial extension downstream of the guide bush;
a diffuser arranged on the downstream side of the spacer; and
a spring arranged between the annular disc and the diffuser;
wherein the spacer is arranged to establish the axial location of the diffuser such that the axial location of the diffuser determines a maximum movement of the annular disc in the downstream direction to a position where the annular disc is in contact with the upstream face of the diffuser.

11. The nozzle check valve according to claim 4 wherein the centre of mass of the annular disc is located along the central axis of the disc at an axial position where the barrel is in sliding contact with the guide bush.

12. The nozzle check valve according to claim 11 wherein the centre of mass of the annular disc is located along the central axis of the disc at an axial position within 20% of the length of the portion of the barrel in sliding contact with the guide bush from the midpoint of the portion of the barrel in sliding contact with the guide bush.

13. The nozzle check valve according to claim 12 wherein the centre of mass of the annular disc is located along the central axis of the disc at an axial position at the midpoint of the portion of the barrel in sliding contact with the guide bush.

14. The nozzle check valve according to claim 10 wherein the centre of mass of the annular disc is located along the central axis of the disc at an axial position where the barrel is in sliding contact with the guide bush.

15. The nozzle check valve according to claim 14 wherein the centre of mass of the annular disc is located along the central axis of the disc at an axial position within 20% of the length of the portion of the barrel in sliding contact with the guide bush from the midpoint of the portion of the barrel in sliding contact with the guide bush.

16. The nozzle check valve according to claim 14 wherein the centre of mass of the annular disc is located along the central axis of the disc at an axial position at the midpoint of the portion of the barrel in sliding contact with the guide bush.

17. The nozzle check valve according to claim 15 wherein the centre of mass of the annular disc is located along the central axis of the disc at an axial position at the midpoint of the portion of the barrel in sliding contact with the guide bush.

18. The nozzle check valve according to claim 1, wherein the spacer being of a first axial length determines a first maximum distance moveable by the annular disc, and wherein the spacer being of a second axial length that is longer than the first axial length determines a second maximum distance moveable by the annular disc, the second maximum distance moveable by the annular disc being greater than the first maximum distance.

19. The nozzle check valve according to claim 10, wherein the spacer being of a first axial length determines a first maximum distance moveable by the annular disc, and wherein the spacer being of a second axial length that is longer than the first axial length determines a second maximum distance moveable by the annular disc, the second maximum distance moveable by the annular disc being greater than the first maximum distance.

\* \* \* \* \*